United States Patent
Natanzon (10) Patent No.: US 12,265,504 B2
(45) Date of Patent: Apr. 1, 2025

(54) METHOD AND SYSTEM OF STORING DATA TO DATA STORAGE FOR VARIABLE SIZE DEDUPLICATION

(71) Applicant: HUAWEI TECHNOLOGIES CO., LTD., Shenzhen (CN)

(72) Inventor: Assaf Natanzon, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/339,081

(22) Filed: Jun. 21, 2023

(65) Prior Publication Data

US 2023/0334023 A1    Oct. 19, 2023

Related U.S. Application Data

(63) Continuation of application No. PCT/EP2020/087373, filed on Dec. 21, 2020.

(51) Int. Cl.
G06F 16/00 (2019.01)
G06F 16/17 (2019.01)
G06F 16/174 (2019.01)

(52) U.S. Cl.
CPC ...... G06F 16/1752 (2019.01); G06F 16/1734 (2019.01)

(58) Field of Classification Search
CPC .......... G06F 16/1752; G06F 16/1734
See application file for complete search history.

(56) References Cited

U.S. PATENT DOCUMENTS

| | | | | |
|---|---|---|---|---|
| 8,402,250 | B1* | 3/2013 | Juillard | G06F 16/1824 |
| | | | | 711/216 |
| 9,465,808 | B1* | 10/2016 | Karr | G06F 16/1748 |
| 9,753,648 | B2* | 9/2017 | Rao | G06F 3/0619 |
| 10,331,362 | B1* | 6/2019 | Parekh | G06F 16/1748 |
| 10,656,858 | B1* | 5/2020 | Karr | G06F 3/0608 |
| 10,970,254 | B2* | 4/2021 | Porat-Stoler | G06F 16/1752 |
| 2009/0271454 | A1* | 10/2009 | Anglin | G06F 11/1453 |
| 2011/0307447 | A1* | 12/2011 | Sabaa | H04L 67/568 |
| | | | | 707/693 |
| 2014/0114934 | A1* | 4/2014 | Chakraborty | G06F 16/1752 |
| | | | | 707/692 |

(Continued)

Primary Examiner — Noosha Arjomandi
(74) Attorney, Agent, or Firm — Leydig, Voit & Mayer, Ltd.

(57) ABSTRACT

A method of storing data to a data storage and related device are provided, wherein data storage is divided into two or more variable size chunks, and each variable size chunks is divided into blocks, and the data storage comprises set of metadata. The data storage is also divided into two fixed size chunks. The method comprises: writing incoming write IO to a position of the corresponding size chunk in the data storage; setting the change indicator for the corresponding fixed size chunk to indicate that the corresponding fixed size chunk has been changed since it was divided into variable sized chunks. When change indicators indicate that division of the associated fixed size chunk or chunks into variable sized chunks should be changed, rechunking fixed size chunk into variable sized chunks is executed. Because of the change indicator, high deduplication is maintained even for offline deduplication in the data storage.

20 Claims, 4 Drawing Sheets

(56) References Cited

U.S. PATENT DOCUMENTS

| | | | |
|---|---|---|---|
| 2014/0181465 A1* | 6/2014 | Baldwin | G06F 3/0641 |
| | | | 711/216 |
| 2015/0213049 A1* | 7/2015 | Kleiman | G06F 16/1752 |
| | | | 707/692 |
| 2018/0088824 A1* | 3/2018 | Rao | G06F 3/0619 |
| 2021/0109900 A1* | 4/2021 | McIlroy | G06F 16/1752 |
| 2022/0291852 A1* | 9/2022 | Mor | G06F 3/0641 |
| 2023/0062644 A1* | 3/2023 | Qiu | G06F 16/1752 |
| 2023/0244571 A1* | 8/2023 | Natanzon | G06F 3/0644 |
| | | | 707/654 |
| 2023/0252001 A1* | 8/2023 | Bent | G06F 3/0679 |
| | | | 707/692 |
| 2024/0028240 A1* | 1/2024 | Shani | G06F 3/0613 |

\* cited by examiner

METHOD AND SYSTEM OF STORING DATA TO DATA STORAGE FOR VARIABLE SIZE DEDUPLICATION

CROSS-REFERENCE TO RELATED APPLICATIONS

This application is a continuation of International Application No. PCT/EP2020/087373, filed on Dec. 21, 2020, the disclosure of which is hereby incorporated by reference in its entirety.

TECHNICAL FIELD

Embodiments of the present disclosure generally relate to the field of data protection and storage; and more specifically, to methods and systems of storing data to a data storage to achieve variable size deduplication.

BACKGROUND

Generally, data is stored in a primary storage system to protect and recover data in an event of data loss in for example a user device. For safety reasons, such primary storage system is extensively used to store the data present in the user device. Typically, with time, storage space of the storage system becomes occupied as changes in data or any new data occupy a large storage space in the conventional storage systems. This is undesirable as it causes reduction in performance of the storage systems. Moreover, the cost of storing data, with all the associated costs including cost of storage hardware, continues to be a burden. Typically, data deduplication is a process widely used by the storage system to eliminate duplicate or redundant data stored on the storage system without compromising the fidelity of the original data. In storage systems, generally data is stored in block storage devices, where a given block storage device is a computer data storage device that supports reading and, writing data in fixed-size blocks, sectors, or clusters.

Currently, deduplication in primary storage systems includes inline deduplication and offline deduplication. The inline deduplication includes fixed size deduplication to save storage space. The fixed size deduplication divides the data stored in the storage system to fixed-size blocks, such as 8 kB aligned blocks. For each fixed-size block, a signature is created. If the aligned block that is to be written has the same signature as an already stored block in the storage system, the aligned block is considered identical. Hence, the aligned bock is not stored again in the storage system and only a pointer is kept for the block identical to the aligned block in the storage system. If the aligned block that is written is not found by the inline deduplication then the offline deduplication is executed which scans the data periodically, and data blocks which are found as identical to other blocks are deleted and replaced with a pointer to a unique copy of the data. However, the fixed size deduplication manifests a low deduplication ratio which is undesirable. Further, fixed size deduplication can perform deduplication only if the blocks are identical. Hence, fixed size deduplication fails to deduplicate the blocks if data within each block is similar but not identical. For example, if a first block and a second block are identical but the second block is shifted by certain bytes, say 512 bytes, or an insert switch is added to the second block, then the fixed size deduplication fails to identify the second block as identical to the first block, and thus, does not provide reliable deduplication of the blocks. Moreover, differential compression is also conventionally used for data reduction. The differential compression allows better data deduplication than the fixed size deduplication. However, the differential compression requires significant amount of computational processing power (e.g. extensive use of central processing unit) for data deduplication process and thus, increases time and unnecessary use of computational resources to complete an operation.

There is another technical problem of how to randomly access chunks of data. Random access refers to the ability to access data at random and performs better than sequential access if information is to be accessed randomly. Generally, a key value-based store associates each data value with a unique key. In other words, a key value-based storage allows accessing specific data using a key. An application can store arbitrary data as a set of values, where a given value (data) can be retrieved or stored by a given key. In an example, when fixed size chunking is used random access is easy as a key to data may be simply a "file_ID" plus a specified offset. But when chunking a file to variable length pieces, an 8 kB fixed size chunk may then include less than 8 kB of data due to compressible data padding, and due to other issues, for example, byte shifting and insert switches, the complexity is increased and the accuracy for random access is reduced. Further, if variable size deduplication technique is implemented for offline deduplication in the primary storage systems, then when data is written in random patterns, a chunking structure may be kept same but less deduplication is obtained.

Therefore, in light of the foregoing discussion, there exists a need to overcome the aforementioned drawbacks associated with conventional methods, devices and systems for data deduplication in primary storages.

SUMMARY

The present disclosure seeks to provide a method and system of storing data to a data storage for variable size deduplication. The present disclosure seeks to provide a solution to the existing problem of low data reduction ratios that is how to further reduce data in a primary storage when variable length chunking is executed on data and how to randomly access chunks of data in case of variable length chunking. An aim of the present disclosure is to provide a solution that overcomes at least partially the problems encountered in prior art, and provides improved system and method that manifest improved data reduction ratios and system performance (i.e. low computational resources usage) in the primary storage as compared to conventional storages. Moreover, the present disclosure also provides a technical solution that enables execution of variable length deduplication with high deduplication in offline deduplication by primary storages. Moreover, the present disclosure also enables an effective and accurate random access to chunks of data even in case of variable length chunking in primary storages.

The object of the present disclosure is achieved by the solutions provided in the enclosed independent claims. Advantageous implementations of the present disclosure are further defined in the dependent claims.

In one aspect, the present disclosure provides a method of storing data to a data storage, the data storage being divided into two or more variable size chunks, and each of the variable size chunks being divided into blocks. The data storage comprises a set of metadata for the data storage including information indicating the size of each variable size chunk. The data storage is also divided into two fixed size chunks, each fixed size chunk having a fixed size x, independently of the division into variable size chunks and each fixed size chunk including padding. The padding being positioned within the fixed size chunk and/or after the fixed size chunk to enable increasing the amount of data in the chunk. The metadata including a change indicator for each fixed size chunk indicating whether data has been written to the fixed size chunk. The method comprising the steps, for one or more incoming write IO operations, each to be written to a corresponding one of the fixed size chunks: writing an incoming write IO to a position of the corresponding size chunk in the data storage, based on the current parsing of the corresponding fixed size chunk. The method further comprises setting the change indicator for the corresponding fixed size chunk to indicate that the corresponding fixed size chunk has been changed since it was divided into variable sized chunks. The method further comprising, when one or more of the change indicators indicate that the division of the associated fixed size chunk or chunks into variable sized chunks should be changed, the steps of rechunking the fixed size chunk into variable sized chunks and setting the change indicator for that fixed size chunk indicate that no write IO has been written to the fixed size chunk since it was divided into variable size chunks. The method further comprises setting the change indicator for that fixed size chunk to indicate that the fixed size chunk has not changed.

The method of the present disclosure achieves improved data deduplication ratios i.e. higher data deduplication. The method leverages variable length deduplication over fixed size deduplication mechanisms, which ensures improved data deduplication ratio in comparison to conventional methods. The method of the present disclosure stores the data in the data storage, where the data storage (e.g. a data file or a set of data in block storage) is divided into two or more variable size chunks. Further, each of the variable size chunks is divided into blocks. The change indicator included in the metadata enables in tracking an amount of changes in the fixed size chunk. Further, when the changes are more than a threshold value only then the fixed size chunk is re-chunked. This enables in keeping high deduplication when offline deduplication is executed by the present method in the data storage. Further, the metadata also enables to accurately perform random access to any data in the data storage.

In an implementation form, the change indicator comprises a change indicator bitmap comprising one or more bits, each bit associated with an area of the corresponding fixed size chunk. The step of setting the change indicator to indicate that the corresponding fixed size chunk has been changed, comprises setting one or more bits corresponding to one or more areas of the fixed size chunks that have been changed, to indicate that these areas have been changed.

The change indicator bitmap tracks the amount of changes in each of one or more areas of the fixed size chunk. Further, when the changes are more than a threshold value of changes only then the fixed size chunk is re-chunked. Thus, this enables in keeping high deduplication when offline deduplication is executed.

In a further implementation form, the change indicator comprises a counter for each fixed size chunk indicating the amount of data that has been written to the fixed size chunk. The step of setting the change indicator to indicate that the corresponding fixed size chunk has been changed, comprises increasing the counter for the first fixed size chunk to indicate the amount of data written to the corresponding fixed size chunk.

The change counter tracks the amount of changes in each of one or more areas of the fixed size chunk. Further, when the changes are more than a threshold value of changes only then the fixed size chunk is re-chunked. Thus, this enables in keeping high deduplication when offline deduplication is executed.

In a further implementation form, each counter is considered to indicate that the division of the associated fixed size chunk or chunks into variable sized chunks should be changed if the counter indicates that more than a certain fraction of the fixed size chunk has been rewritten.

The counter enables in identification when the fixed size chunk has changed more than the certain fraction and only then the fixed size chunk is re-chunked. As a result, high deduplication ratio is obtained by the method of the present disclosure.

In a further implementation form, the padding for each fixed size chunk is added to a total chunk size of $(1+n/y)*x$, where n is the size of the blocks, y is the average size of the variable size chunks and x is the size of the fixed size chunk.

The padding within the fixed size chunk and/or after the fixed size chunk is such added that the total chunk is of size of $(1+n/y)*x$ after adding padding to ensure no data spilling between the at least two fixed size chunks of the data storage.

In a further implementation form, each fixed size chunk comprises metadata indicating an offset of data in the fixed size chunk to allow random access to the data in the data storage.

In order to allow random accessing of data in the data storage, the metadata that indicates the offset of data is stored in the metadata block.

In a further implementation form, the step of periodically performing offline deduplication on fixed size chunks for which the associated indicator bit indicates that one or more write IOs have been written to the fixed size chunk since it was divided into variable sized chunks.

By virtue of using the change indicator, the present method enables in maintaining a high deduplication ratio when executing offline deduplication for data storages in comparison to conventional methods used by data storages which have low deduplication when variable length chunking is executed.

In another aspect, the present disclosure provides a control unit for a data storage, where the data storage is divided into two or more variable size chunks, and each of the variable size chunks being divided into blocks. The data storage comprises a set of metadata for the data storage including information indicating the size of each variable size chunk. The data storage is also divided into two fixed size chunks, where each fixed size chunk has a fixed size x, independently of the division into variable size chunks and each fixed size chunk including padding. The padding is positioned within the fixed size chunk and/or after the fixed size chunk to enable increasing the amount of data in the chunk. The metadata including a change indicator bit for each fixed size chunk indicating whether data has been written to the fixed size chunk. The control unit being arranged when an incoming write IO for a fixed size chunk is received, to write the incoming write IO in a position of the corresponding size chunk in the data storage, based on the current parsing of the corresponding fixed size chunk, to set the change indicator bit for the corresponding fixed size chunk. This is to indicate that a write IO has been written to the corresponding fixed size chunk since it was divided into variable sized chunks and to increase the counter for the first fixed size chunk to indicate the amount of data written to the corresponding fixed size chunk. The control unit being further arranged, when one or more of the counters indicate that the division of the associated fixed size chunk or chunks into variable sized chunks should be changed, to rechunk the fixed size chunk into variable sized chunks, to set the change indicator for that fixed size chunk to indicate that no write IO has been written to the fixed size chunk since it was divided into variable size chunks, and to set the counter for that fixed size chunk to zero.

The control unit of the present disclosure enables to achieve improved data deduplication ratios i.e. higher data deduplication. The control unit achieves all the advantages and effects of the method of the present disclosure.

In another aspect, the present disclosure provides a data storage system, where the data storage is divided into two or more variable size chunks, and each of the variable size chunks is divided into blocks. The data storage comprises a set of metadata for the data storage including information indicating the size of each variable size chunk. The data storage is also divided into two fixed size chunks, each fixed size chunk having a fixed size x, independently of the division into variable size chunks and each fixed size chunk including padding. The padding is positioned within the fixed size chunk and/or after the fixed size chunk to enable increasing the amount of data in the chunk, said metadata including a change indicator for each fixed size chunk indicating whether data has been written to the fixed size chunk, where the data storage system comprises a control unit.

The data storage system of the present disclosure enables to achieve improved data deduplication ratios i.e. higher data deduplication. The data storage system achieves achieves all the advantages and effects of the method of the present disclosure.

It is to be appreciated that all the aforementioned implementation forms can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
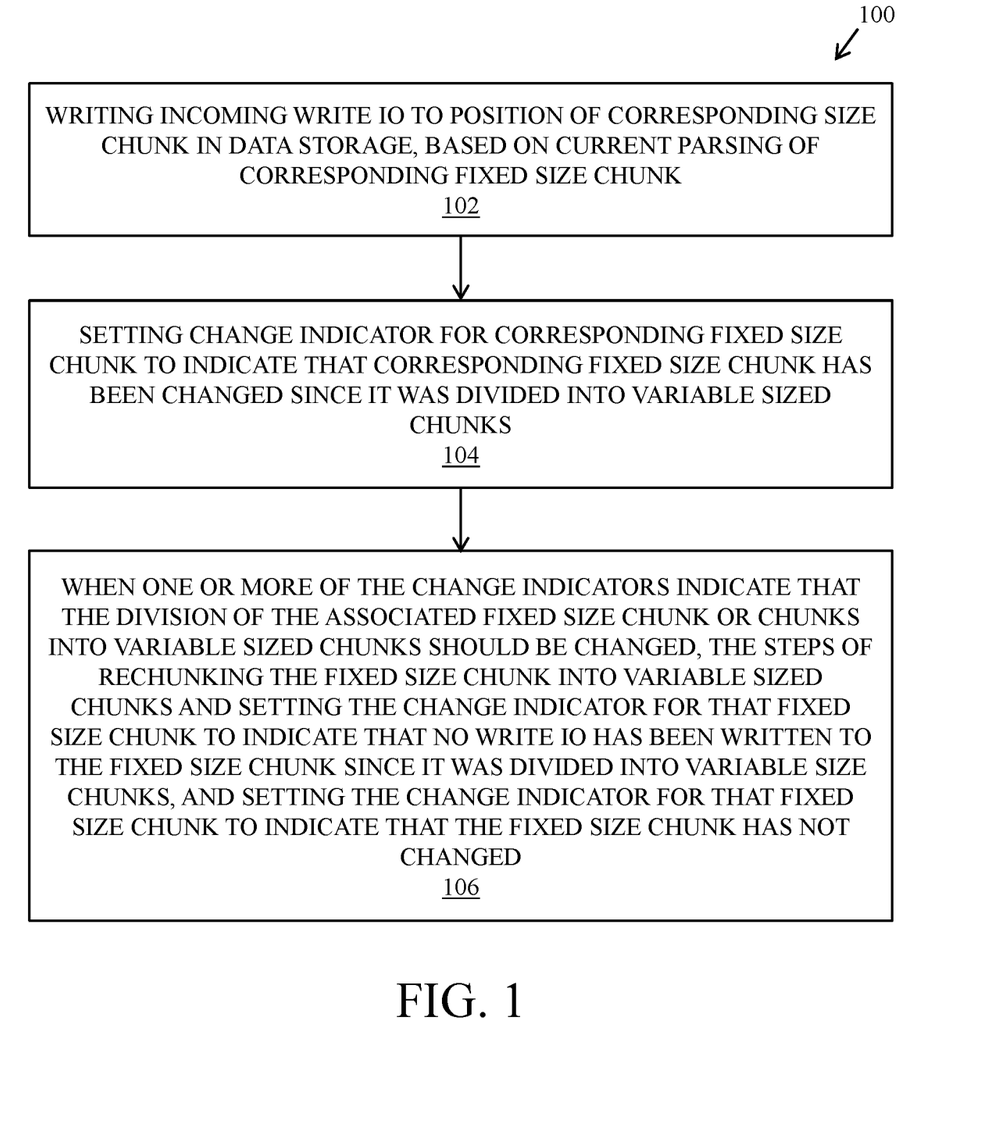
FIG. 1 is a flowchart of a method of storing data to a data storage for variable size deduplication, in accordance with an embodiment of the present disclosure.

FIG. 1 is a flowchart of a method of storing data to a data storage, in accordance with an embodiment of the present disclosure With reference to FIG. 1 there is shown a method 100. The method 100 is executed at a data storage system described, for example, in FIG. 2. The method 100 includes steps 102, 104, and 106.

In one aspect, the present disclosure provides a method 100 of storing data to a data storage, said data storage being divided into two or more variable size chunks, each of the variable size chunks being divided into blocks, and said data storage comprising a set of metadata for the data storage including information indicating the size of each variable size chunk, the data storage being also divided into two fixed size chunks, each fixed size chunk having a fixed size x, independently of the division into variable size chunks and each fixed size chunk including padding, said padding being positioned within the fixed size chunk and/or after the fixed size chunk to enable increasing the amount of data in the chunk, said metadata including a change indicator for each fixed size chunk indicating whether data has been written to the fixed size chunk, the method 100 comprising the steps, for one or more incoming write IO operations, each to be written to a corresponding one of the fixed size chunks:

writing an incoming write IO to a position of the corresponding size chunk in the data storage, based on the current parsing of the corresponding fixed size chunk;

setting the change indicator for the corresponding fixed size chunk to indicate that the corresponding fixed size chunk has been changed since it was divided into variable sized chunks;

the method 100 further comprising, when one or more of the change indicators indicate that the division of the associated fixed size chunk or chunks into variable sized chunks should be changed, the steps of rechunking the fixed size chunk into variable sized chunks and setting the change indicator for that fixed size chunk to indicate that no write IO has been written to the fixed size chunk since it was divided into variable size chunks, and setting the change indicator for that fixed size chunk to indicate that the fixed size block has not changed.

The method 100 of storing data to a data storage, said data storage is divided into two or more variable size chunks, each of the variable size chunks being divided into blocks, and said data storage comprising a set of metadata for the data storage including information indicating the size of each variable size chunk. The storing of data to the data storage refers to storing data to a primary storage, for example, storing user data (of a user device) into the primary storage. The data storage is divided into two or more variable size chunks, such as a first chunk and a second chunk. In an example, the data storage may correspond to a data file, which is divided into two or more variable size chunks. In another example, the data storage may correspond to a file of a specified file format, such as a Virtual Machine Disk (VMDK) file format, in a primary storage (such as a block storage). In yet another example, the data storage may correspond to storing a set of data in a block storage. In an example, the data storage may be divided into two or more variable size chunks using a variable chunking algorithm. In an example, the data storage may have a size of 20 kB and this is divided into a first chunk of size 14 kB and a second chunk of size 6 kB. Further, each of the first chunk and the second chunk is divided into blocks. Generally, one block corresponds to a specific number of bytes occupied in physical storage space, such as 4 kilobytes (kB) data block, 8 kB data block, and the like. The block may be also referred to as a logical block. In an example, a block is potentially the smallest unit of data (i.e. a defined amount of data) used by a database. For example, the data storage may be stored in the form of the blocks of a defined (or fixed) size, for example, 8 kB. In an example, the data storage having a size of 20 kB is divided into three blocks. The data storage further comprises the set of metadata for the data storage including information indicating the size of each variable size chunk. In an example, the set of metadata includes information regarding the size of each the first chunk and the second chunk. The metadata may further include information such as the data storage name, the data storage ID and other data storage properties. In an example, the set of metadata for the data storage is File.txt, ID=1, and size=18 kB. The metadata includes information regarding the size of each block to allow random access of each block of the data storage for random write/read operation.

The data storage being also divided into two fixed size chunks, each fixed size chunk having a fixed size x, independently of the division into variable size chunks and each fixed size chunk including padding, said padding being positioned within the fixed size chunk and/or after the fixed size chunk to enable increasing the amount of data in the chunk, said metadata including a change indicator for each fixed size chunk indicating whether data has been written to the fixed size chunk. The data storage is further divided into two or more fixed size chunks, such as a first fixed size chunk and a second fixed size chunk. For example, the data storage is divided into the first fixed size chunk and the second fixed size chunk of fixed size x=4 MB each. Further, padding (e.g. padding of zeros) is added to each the first fixed size chunk and the second fixed size chunk so that adequate space is kept in each chunk to allow space for movement of the data while performing new writes in the data storage. Hence, padding prevents data spilling between different chunks (e.g. the first fixed size chunk and the second fixed size chunk) when performing new writes, avoids re-copying of entire data storage, and thus, makes writing the data faster. In an implementation, the padding may be added within each of the divided chunks. In another implementation, padding may be added in some chunks, while some chunks may not be padded with zeros depending on how much new data writes is expected to be written in the data storage. In an example, if a 16 megabyte (MB) chunk is divided into four 4 MB chunks, almost 50% of data may be padded with zeros, that is 2 MB of padding for each 4 MB chunks, this 2 MB padding between each chunk allows variable size chunking without need to rewrite the whole data storage, so the actual size of the data storage with padding will be 24 MB. The fixed size chunks will typically be much larger than the variable sized chunk for example 4 MB fixed size chunk vs. variable size chunks ranging from 8 to 32 KB. For each fixed size chunk the metadata notifies how and what is the percentage of fixed size chunk that was overwritten. In an example, a limit may be kept for the amount of meta data used for each fixed size chunk of 4 MB by limiting the amount of bits that are kept, for example single bit for every 8 KB of the 4 MB is kept, so that the total amount of data needed to describe the percentage of changes in the 4 MB fixed size chunk will be 512 bits of 64 bytes. Further to have a coarser granularity a limit may be kept on the memory for each 4 MB fixed size chunk to 4 bytes allowing to have granularity of 64 KB changes. The metadata includes the change indicator for each fixed size chunk such as the first fixed size chunk and the second fixed size chunk. The change indicator enables in identifying a total amount of writes that are executed to each of the fixed size chunk.

According to an embodiment, the blocks may have different sizes depending on the amount of data in each block, and the metadata includes information indicating the size of each block. The metadata includes information regarding the size of each block to allow random access of each block of the data storage for random write/read operation. Hence, random access of each blocks are allowed by accessing the correct entries in the metadata. The metadata may further include information such as the data storage name, the data storage ID and other data storage properties. In an example, a block of size 4 MB may have the metadata kept in the first 8 kB of each such 4 MB.

According to an embodiment, the padding for each fixed size chunk is added to a total chunk size of $(1+n/y)*x$, where n is the size of the blocks, y is the average size of the variable size chunks and x is the size of the fixed size chunks. The size of the fixed size chunk (i.e x) may grow in size due to adding padding within the data storage. The data storage can maximum grow to size of $(1+n/y)*x$ due to the padding.

Here, n represents the size of the blocks (e.g. n may be 8 kB), y represents average chunk size of variable size chunks and x represents size of the fixed size chunks. For example, if the size of the fixed size chunks (denoted by x) is 4 megabytes, average chunk size of the variable size chunks (chuck size denoted by y) is 16 kB and the size of the blocks (represented by n) is 8 kB, each chunk will be padded with at most 8 kB of zeros. So, for every 16 kB of data, we add 8 kB of data, i.e. the zeros are at most 50% of the data. Hence, the block of 4 MB will grow to a maximum of 6 MB. The padding is done within the fixed size chunk and/or after the fixed size chunk so that the at least two fixed size chunks have adequate space for data movements when new write data is received, and that there is no chance of data spilling between at least two fixed size chunks.

According to an embodiment, each fixed size chunk comprises metadata indicating an offset of data in the fixed size chunk to allow random access to the data in the data storage. In order to allow accessing of data in the data storage in random access, each chunk comprises metadata, which is stored in the first block referred to as a metadata block at the beginning of each of fixed size chunks. For example, if the size of a chunk in a data storage is 4 MB and is divided into 8 KB blocks then, the chunk will be divided into 512 8 kB blocks. Given the possibility chunking or re-chunking a given chunk at every update, the metadata that indicates the offset of data allows understanding where all 512 8 kB blocks are located in the chunk and overall, the data storage.

The method 100 comprises the steps 102 to 106, for one or more incoming write IO operations, each to be written to a corresponding one of the fixed size chunks. The change indicator updates a count of the writes for a given fixed size chunk for every one or more incoming write IO operations.

At step 102, the method 100 comprises writing an incoming write IO to a position of the corresponding size chunk in the data storage, based on the current parsing of the corresponding fixed size chunk. The fixed size chunks such as the first fixed size chunk may be parsed i.e. via re-chunking. The first fixed size chunk can be re-chunked granularly without affecting any other part of the data storage, that is without affecting for example the second fixed size chunk and thus avoids rewrite of the whole data storage when the incoming write IO is to be written. The first fixed size chunk when re-chunked will have different positions along with padding to store incoming write IOs and the metadata for the first fixed size chunk may be kept at a beginning few kB of the first fixed size block. Thus, when the incoming write IO is received by the data storage, the incoming write IO is stored in the fixed size chunk based on the available positions for storing the incoming write IOs.

At step 104, the method 100 comprises setting the change indicator for the corresponding fixed size chunk to indicate that the corresponding fixed size chunk has been changed since it was divided into variable sized chunks. The change indicator is included in metadata of the fixed size chunk to understand the total amount of writes that happen to the fixed size chunk. The change indicator will track the amount of changes in the fixed size chunk. Initially when the fixed size chunk is divided into variable sized chunks, the change indicator is set to for example zero value or a start value indicating that no changes have been made to the fixed size chunk. Further, as write operations are executed, and fixed size chunk is changed, the change indicator is updated to higher value say 1, 2, 3 and so on based on the changes (i.e. via write operation) made in the fixed size chunk.

According to an embodiment, the change indicator comprises a change indicator bitmap comprising one or more bits, each bit associated with an area of the corresponding fixed size chunk, wherein the step of setting the change indicator to indicate that the corresponding fixed size chunk has been changed comprises setting one or more bits corresponding to one or more areas of the fixed size chunks that have been changed, to indicate that these areas have been changed. The change indicator bitmap refers to a combination of one or more bits to enable indication that one or more areas in the corresponding fixed size chunk has been changed since it was divided into variable sized chunks. The change indicator bitmap will track the amount of changes in each of the one or more areas of the fixed size chunk. Initially when the fixed size chunk is divided into variable sized chunks, first bit of the change indicator bitmap is set to for example zero-bit value indicating that no changes have been made to a first area of the fixed size chunk. Further, as write operations are executed on first area, the change indicator bitmap is updated to one-bit value. In an example, zero-bit value may represent that given area of fixed size chunk is unchanged and one-bit value may represent that the given area of fixed size chunk is changed via write operation. Further, when the changes are more than a threshold value of changes only then the fixed size chunk is re-chunked. Thus, this enables in keeping high deduplication when offline deduplication is executed.

According to an embodiment, the change indicator comprises a counter for each fixed size chunk indicating the amount of data that has been written to the fixed size chunk, wherein the step of setting the change indicator to indicate that the corresponding fixed size chunk has been changed comprises increasing the counter for the first fixed size chunk to indicate the amount of data written to the corresponding fixed size chunk. The counter is configured to keep track of the amount of changes in the fixed size chunk by updating a counter value. In an example, counter may have numeric value, alphabetic value or alphanumeric value. In another example, counter may have values such as 0, 1, 2, 3, and so on, or values such as A, B, C, D, E, and so on, or values such as 1A, 2A, 3A, 1B, 2B, 2C and so on depending on for example, a number of areas of the fixed size chunk. Initially when the fixed size chunk is divided into variable sized chunks, the counter is set to for example 0 indicating that no changes have been made to the fixed size chunk. Further, as write operations are executed, and fixed size chunk is changed, the counter is updated to higher value say 1, 2, 3 and so on based on the changes made in the fixed size chunk. Further, when the changes are more than a threshold value of changes only then the fixed size chunk is re-chunked. Thus, this enables in keeping high deduplication when offline deduplication is executed.

At step 106, the method 100 comprises when one or more of the change indicators indicate that the division of the associated fixed size chunk or chunks into variable sized chunks should be changed, the steps of rechunking the fixed size chunk into variable sized chunks and setting the change indicator for that fixed size chunk to indicate that no write IO has been written to the fixed size chunk since it was divided into variable size chunks, and setting the change indicator for that fixed size chunk to indicate that the fixed size block has not changed. In an example, when one or more of the change indicators, indicate that the corresponding fixed size chunk has been changed more than threshold value then fixed size chunk is re-chunked and further the change indicator is cleared or reset to indicate that no write IO has been written to the fixed size chunk. The steps of rechunking the fixed size chunk includes reading the fixed size chunk, chunking the fixed size chunk and rewriting the fixed size chunk. Thus, the method 100 of the present disclosure enables to achieve improved data deduplication ratios i.e. higher data deduplication. The method leverages variable length deduplication over fixed size deduplication mechanisms, which ensures to achieve improved data deduplication ratio in comparison to conventional method. The method 100 of the present disclosure stores the data in the data storage, where the data storage (e.g. a data file or a set of data in block storage) is divided into two or more variable size chunks. Further, each of the variable size chunks is divided into blocks. The change indicator included in the metadata enables in tracking an amount of changes in the fixed size chunk. Further, when the changes are more than a threshold value of changes only then the fixed size chunk is re-chunked. Thus, this enables in keeping high deduplication when offline deduplication is executed by the present method 100 in the data storage in a primary storage system.

According to an embodiment, each counter is considered to indicate that the division of the associated fixed size chunk or chunks into variable sized chunks should be changed if the counter indicates that more than a certain fraction of the fixed size chunk has been rewritten. The certain fraction herein refers to a threshold value of for example a percentage of the fixed size chunk that has been rewritten. The counter enables in identification when the fixed size chunk has changed more than the certain fraction and only then the fixed size chunk is re-chunked. When the fixed size chunk has changed more than the certain fraction then the fixed size chunk is re-chunked. As a result, high deduplication ratio is obtained by the method 100 of the present disclosure.

According to an embodiment, the fraction is 20%, 40% or 50% of the fixed size chunk. In an example, the fraction may have any other value such as 10%, 21%, 25%, 60% and the like. Further, when fraction is 20% then 20% of the area of the fixed size chunk has been changed, similarly when fraction is 40% then 40% of the area of the fixed size chunk has been changed. Beneficially, the value of amount of changes after which the fixed size chunk is re-chunked may be adjusted based on, for example, a user input.

According to an embodiment, the method 100 further comprising the step of periodically performing offline deduplication on fixed size chunks for which the associated indicator bit indicates that one or more write IOs have been written to the fixed size chunk since it was divided into variable sized chunks. The offline deduplication includes a process of scanning the data storage (e.g. a data file or a set of data in block storage) periodically, and chunks which are found as identical to other chunks in data storage are deleted and replaced with a pointer to a unique copy of the data. Thus, by using the change indicator, the present method enables in maintaining a high deduplication ratio when executing offline deduplication for data storages in comparison to conventional methods used by data storages which have low deduplication when variable length chunking is executed. The rechunking is done periodically based on the changes and then with the new chunking the offline deduplication finds the duplicates.

Thus, the method 100 of the present disclosure enables to achieve improved data deduplication ratios i.e. higher data deduplication. The method 100 leverages variable length deduplication over fixed size deduplication mechanisms, which ensures to achieve improved data deduplication ratio in comparison to conventional method. The method 100 of the present disclosure stores the data in the data storage, where the data storage (e.g. a data file or a set of data in block storage) is divided into two or more variable size chunks. Further, each of the variable size chunks is divided into blocks. The change indicator included in the metadata enables in tracking an amount of changes in the fixed size chunk. Further, when the changes are more than a threshold value of changes only then the fixed size chunk is re-chunked. Thus, this enables in keeping high deduplication when offline deduplication is executed by the present method 100 in the data storage. Further, the metadata also enables to accurately perform random access to any data in the data storage.

The steps 102 to 108 are only illustrative and other alternatives can also be provided where one or more steps are added, one or more steps are removed, or one or more steps are provided in a different sequence without departing from the scope of the claims herein.

In another aspect provided is a computer-readable media comprising computer-readable instructions for implementing the method 100 of storing data to the data storage (e.g. a data file or a set of data in block storage). The computer readable media comprising computer-readable instructions may include, but is not limited to, an electronic storage device, a magnetic storage device, an optical storage device, an electromagnetic storage device, a semiconductor storage device, or any combination of the foregoing. In yet another aspect, the present disclosure provides a computer program adapted to perform the method 100 by a device (e.g. control unit). In another aspect, the present disclosure provides a computer program product comprising a non-transitory computer-readable storage medium having computer-readable instructions being executable by a processor to execute the method 100. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, or CPU cache memory.

Figure 2:
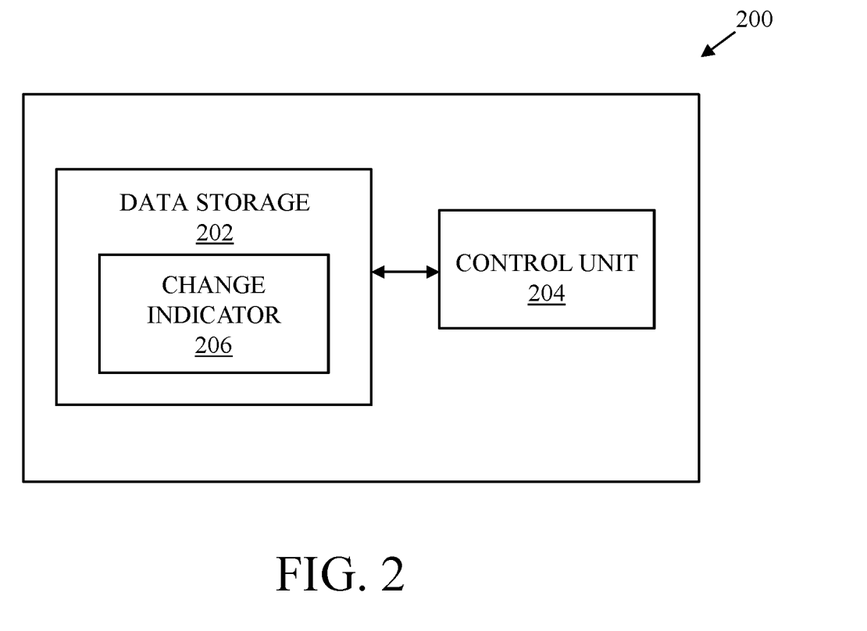
FIG. 2 is a block diagram that illustrates a data storage system, in accordance with an embodiment of the present disclosure.

FIG. 2 is a block diagram that illustrates a data storage system, in accordance with an embodiment of the present disclosure. With reference to FIG. 2 there is shown a data storage system 200. The data storage system 200 includes a data storage 202 and a control unit 204. The data storage 202 further includes a change indicator 206.

In another aspect the present disclosure provides a data storage system 200, said data storage 202 being divided into two or more variable size chunks, each of the variable size chunks being divided into blocks, and said data storage 202 comprising a set of metadata for the data storage 202 including information indicating the size of each variable size chunk, the data storage 202 being also divided into two fixed size chunks, each fixed size chunk having a fixed size x, independently of the division into variable size chunks and each fixed size chunk including padding, said padding being positioned within the fixed size chunk and/or after the fixed size chunk to enable increasing the amount of data in the chunk, said metadata including a change indicator 206 for each fixed size chunk indicating whether data has been written to the fixed size chunk, said data storage system 200 comprising a control unit 204.

In yet another aspect the present disclosure provides a control unit 204 for a data storage 202, said data storage 202 being divided into two or more variable size chunks, each of the variable size chunks being divided into blocks, and said data storage 202 comprising a set of metadata for the data storage 202 including information indicating the size of each variable size chunk,     the data storage 202 being also divided into two fixed size chunks, each fixed size chunk having a fixed size x, independently of the division into variable size chunks and each fixed size chunk including padding, said padding being positioned within the fixed size chunk and/or after the fixed size chunk to enable increasing the amount of data in the chunk, said metadata including a change indicator 206 bit for each fixed size chunk indicating whether data has been written to the fixed size chunk,     the control unit 204 being arranged when an incoming write IO for a fixed size chunk is received, to write the incoming write IO in a position of the corresponding size chunk in the data storage 202, based on the current parsing of the corresponding fixed size chunk, to set the change indicator bit for the corresponding fixed size chunk to indicate that a write IO has been written to the corresponding fixed size chunk since it was divided into variable sized chunks and to increase the counter for the first fixed size chunk to indicate the amount of data written to the corresponding fixed size chunk;

the control unit 204 being further arranged, when one or more of the counters indicate that the division of the associated fixed size chunk or chunks into variable sized chunks should be changed, to rechunk the fixed size chunk into variable sized chunks, to set the change indicator 206 for that fixed size chunk to indicate that no write IO has been written to the fixed size chunk since it was divided into variable size chunks, and to set the counter for that fixed size chunk to zero.

The data storage system 200 refers to a primary storage system configured to store one or more data files in a smart file format. In an implementation, the data storage system 200 is a primary storage device. In another implementation, the data storage system 200 may be a storage array that collectively forms a primary storage system. The data storage system 200 may include one or more other components, such as a network interface, not shown here for the sake of brevity.

In an implementation, the data storage 202 herein refers to a data file that stores the data received by the data storage system 200. The data may be received from one or more user devices in a production environment that are coupled to the data storage system 200. In another implementation, the data storage 202 may correspond to a file of a specified file format, such as a Virtual Machine Disk (VMDK) file format, in a primary storage (such as a block storage). In yet another example, the data storage 202 may correspond to storing a set of data in a block storage.

The control unit 204 includes suitable logic, circuitry, and/or interfaces that is configured to implement processing steps pertaining to writing incoming write IO in a position of the corresponding size chunk in the data storage 202 and rechunk the fixed size chunk into variable sized chunks based on the change indicator 206. The control unit 204 may also be referred to as a controller or control circuitry. Examples of the control unit 204 includes, but are not limited to a microprocessor, a microcontroller, a complex instruction set computing (CISC) microprocessor, a reduced instruction set (RISC) microprocessor, a very long instruction word (VLIW) microprocessor, a central processing unit (CPU), a state machine, a data processing unit, and other processors or control circuitry. Moreover, the control unit 204 may refer to one or more individual processors, processing devices, a processing unit that is part of a machine, such as the data storage system 200.

In operation, the data storage 202 (e.g. a data file or a set of data in block storage) is divided into two or more variable size chunks, each of the variable size chunks being divided into blocks, and said data storage 202 comprises a set of metadata for the data storage 202 including information indicating the size of each variable size chunk. The data storage 202 is also divided into two fixed size chunks, each fixed size chunk having a fixed size x, independently of the division into variable size chunks and each fixed size chunk includes padding, said padding being positioned within the fixed size chunk and/or after the fixed size chunk to enable increasing the amount of data in the chunk, said metadata includes a change indicator 206 for each fixed size chunk indicating whether data has been written to the fixed size chunk. In an example, the data storage 202 is divided into the fixed size chunk of fixed size x=4 MB each. Further, padding (e.g. padding of zeros) is added to each the fixed size chunk so that adequate space is kept in each chunk to allow space for movement of the data while performing new writes in the data storage 202. Hence, padding prevents data spilling between different chunks. For each fixed size chunk the metadata notifies how and what is the percentage of fixed size chunk that was overwritten. The metadata includes the change indicator 206 for each fixed size chunk. The change indicator 206 enables in identifying a total amount of writes that are executed to each of the fixed size chunk.

According to an embodiment, the change indicator 206 of the data storage 202 comprises a change indicator bitmap comprising one or more bits, each bit associated with an area of the corresponding fixed size chunk. The change indicator bitmap refers to a combination of one or more bits to enable indication that one or more areas in the corresponding fixed size chunk has been changed since it was divided into variable sized chunks. The change indicator bitmap will track the amount of changes in each of the one or more areas of the fixed size chunk. Further, when the changes are more than a threshold value of changes only then the fixed size chunk is re-chunked. Thus, this enables in keeping high deduplication when offline deduplication is executed.

According to an embodiment, the change indicator 206 comprises a counter for each fixed size chunk indicating the amount of data that has been written to the fixed size chunk. The counter is configured to keep track of the amount of changes in the fixed size chunk by updating a counter value. In an example, counter may have numeric value, alphabetic value or alphanumeric value. Further, when the changes are more than a threshold value of changes only then the fixed size chunk is re-chunked. Thus, this enables in keeping high deduplication when offline deduplication is executed.

According to an embodiment, the blocks may have different sizes depending on the amount of data in each block, and the metadata includes information indicating the size of each block. The metadata includes information regarding the size of each block to allow random access of each block of the data storage 202 for random write/read operation. Hence, random access of each blocks are allowed by accessing the correct entries in the metadata.

According to an embodiment, the padding for each fixed size chunk is added to a total chunk size of $(1+n/y)*x$, where n is the size of the blocks, y is the average size of the variable size chunks and x is the size of the fixed size chunk. The size of the fixed size chunk (i.e. x) may grow in size due to adding padding within the data storage 202. The data storage 202 can maximum grow to size of $(1+n/y)*x$ due to the padding. Here, n represents the size of the blocks, y represents average chunk size of variable size chunks and x represents size of the fixed size chunks. The padding within the fixed size chunk and/or after the fixed size chunk is such added to ensure no data spilling between the at least two fixed size chunks of the data storage.

According to an embodiment, each fixed size chunk comprises metadata indicating an offset of data in the fixed size chunk to allow random access to the data in the data storage 202. In order to allow accessing of data in the data storage 202 in random access, each chunk comprises metadata, which is stored in the first block referred to as a metadata block at the beginning of each of fixed size chunks.

The data storage system 200 enables to achieve improved data deduplication ratios i.e. higher data deduplication. The data storage system 200 leverages variable length deduplication over fixed size deduplication mechanisms, which ensures to achieve improved data deduplication ratio in comparison to conventional system. The data storage system 200 of the present disclosure stores the data in the data storage 202, where the data storage 202 (e.g. a data file or a set of data in block storage) is divided into two or more variable size chunks. Further, each of the variable size chunks is divided into blocks. The change indicator 206 included in the metadata enables in tracking an amount of changes in the fixed size chunk. Further, when the changes are more than a threshold value of changes only then the fixed size chunk is re-chunked. Thus, this enables in keeping high deduplication when offline deduplication is executed by the data storage system in the data storage.

In operation, the control unit 204 is arranged when an incoming write IO for a fixed size chunk is received, to write the incoming write IO in a position of the corresponding size chunk in the data storage 202, based on the current parsing of the corresponding fixed size chunk, to set the change indicator bit for the corresponding fixed size chunk to indicate that a write IO has been written to the corresponding fixed size chunk since it was divided into variable sized chunks and to increase the counter for the first fixed size chunk to indicate the amount of data written to the corresponding fixed size chunk. The fixed size chunks may be parsed i.e. via re-chunking. The fixed size chunk can be re-chunked granularly without affecting any other part of the data storage 202 (e.g. a data file or a set of data in block storage) when the incoming write IO is to be written. The fixed size chunk when re-chunked will have different positions along with padding to store incoming write IOs and the metadata for the first fixed size chunk may be kept at a beginning few kB of the fixed size block. Thus, when the incoming write IO is received, the incoming write IO is stored in the fixed size chunk based on the available positions for storing the incoming write IOs. The change indicator 206 is included in metadata of the fixed size chunk to understand the total amount of writes that happen to the fixed size chunk. The change indicator 206 will track the amount of changes in the fixed size chunk.

The control unit 204 is further arranged, when one or more of the counters indicate that the division of the associated fixed size chunk or chunks into variable sized chunks should be changed, to rechunk the fixed size chunk into variable sized chunks, to set the change indicator 206 for that fixed size chunk to indicate that no write IO has been written to the fixed size chunk since it was divided into variable size chunks, and to set the counter for that fixed size chunk to zero. In an example, when one or more of the counters, indicate that the corresponding fixed size chunk has been changed more than threshold value then fixed size chunk is re-chunked and further the counter is cleared or reset to indicate that no write IO has been written to the fixed size chunk. The steps of rechunking the fixed size chunk includes reading the fixed size chunk, chunking the fixed size chunk and rewriting the fixed size chunk. Thus, the system 200 of the present disclosure enables in having high deduplication ratio as compared to conventional systems for primary storage.

According to an embodiment, the change indicator 206 in the data storage 202 having the control unit 204 comprises a change indicator bitmap comprising one or more bits, each bit associated with an area of the corresponding fixed size chunk. The change indicator bitmap refers to a combination of one or more bits to enable indication that one or more areas in the corresponding fixed size chunk has been changed since it was divided into variable sized chunks. The change indicator bitmap will track the amount of changes in each of the one or more areas of the fixed size chunk. Further, when the changes are more than a threshold value of changes only then the fixed size chunk is re-chunked. Thus, this enables in keeping high deduplication when offline deduplication is executed.

According to an embodiment, the change indicator 206 in the data storage 202 having the control unit 204 comprises a counter for each fixed size chunk indicating the amount of data that has been written to the fixed size chunk. The counter is configured to keep track of the amount of changes in the fixed size chunk by updating a counter value. In an example, counter may have numeric value, alphabetic value or alphanumeric value.

According to an embodiment, the control unit 204 is arranged to determine that a counter is considered to indicate that the division of the associated fixed size chunk or chunks into variable sized chunks should be changed if the counter indicates that more than a certain fraction of the fixed size chunk has been rewritten. The certain fraction herein refers to a threshold value of for example a percentage of the fixed size chunk that has been rewritten. When the fixed size chunk has changed more than the certain fraction then the fixed size chunk is re-chunked. As a result, high deduplication ratio is obtained by the data storage system 200 of the present disclosure.

According to an embodiment, the control unit 204 is arranged to periodically perform offline deduplication on fixed size chunks for which the associated indicator bit indicates that no write IO has been written to the fixed size chunk since it was divided into variable sized chunks. The offline deduplication executed by the control unit 204 enables in scanning the data storage 202 periodically, and chunks which are found as identical to other chunks in data storage 202 are deleted and replaced with a pointer to a unique copy of the data. Thus, by using the change indicator 206, the control unit 204 enables in maintaining a high deduplication ratio when executing offline deduplication for data storages in comparison to conventional data storages which have low deduplication when variable length chunking is executed.

Beneficially, the control unit 204 achieves improved data deduplication ratios i.e. higher data deduplication. The control unit 204 leverages variable length deduplication over fixed size deduplication mechanisms, which ensures to achieve improved data deduplication ratio. The change indicator 206 included in the metadata enables in tracking an amount of changes in the fixed size chunk. Further, when the changes are more than a threshold value of changes only then the fixed size chunk is re-chunked. Thus, this enables in keeping high deduplication when offline deduplication is executed by the control unit 204.

Figure 3A:
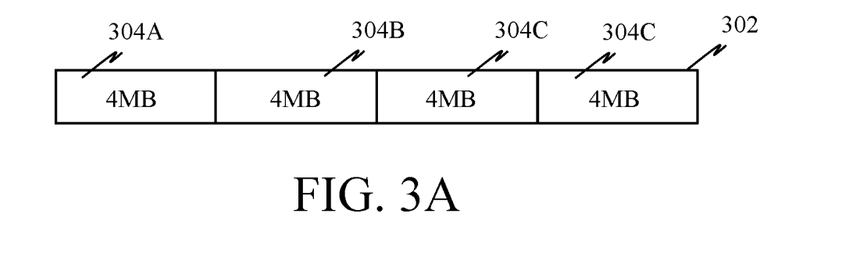
FIG. 3A-3C are exemplary illustrations of configuring data storage to allow writing a new sequence of data in the data storage without data spilling between different chunks, in accordance with an embodiment of the present disclosure.
Figure 3B:
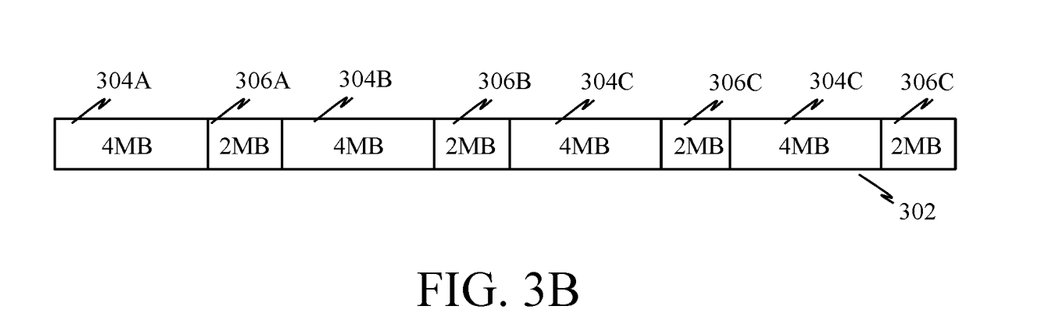
Figure 3C:
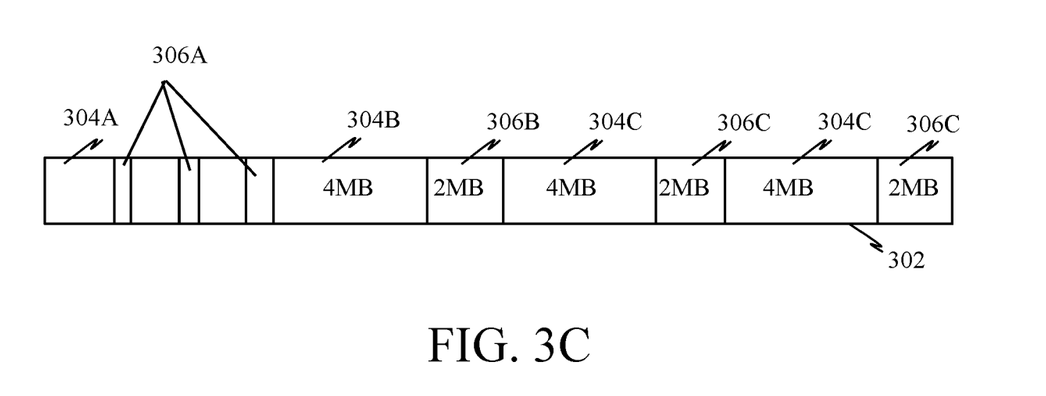

FIG. 3A-3C are exemplary illustrations of configuring data storage to allow writing a new sequence of data in the data storage without data spilling between different chunks, in accordance with an embodiment of the present disclosure. With reference to FIG. 3A, there is shown the data storage 302 (as a data file) in the data storage system 200 (of FIG. 2). The data storage 302 (e.g. a data file) is divided into a first chunk 304A, a second chunk 304B, a third chunk 304C and a fourth chunk 304D. For example, the size of the data storage 302 is 16 MB and the size of each of the first chunk 304A, the second chunk 304B, the third chunk 304C and the fourth chunk 304D is 4 MB.

With reference to FIG. 3B, there is shown data storage 302 in the data storage system 200 (of FIG. 2) with the padding within the fixed size chunks. In other words, a first padding 306A is added within the first chunk 304A (i.e. at the end of the first chunk 304A, which implies padding between the first chunk 304A and the second chunk 304B). Similarly, a second padding 306B is added within the second chunk 304B (which implies padding between the second chunk 304B and the third chunk 304C) Likewise, third padding 306C and the fourth padding 306D are added to their corresponding chunks, as shown. Further, size of each of the first padding 306A, the second padding 306B, the third padding 306C and the fourth padding 306D is kept about 50% of the size of each of the first chunk 304A, the second chunk 304B, the third chunk 304C and the fourth chunk 304D. For example, the size of the first chunk 304A, the second chunk 304B, the third chunk 304C and the fourth chunk 304D is 4 MB each then, the size of each of the first padding 306A, the second padding 306B, the third padding 306C and the fourth padding 306D is 2 MB. The first padding 306A, the second padding 306B, the third padding 306C and the fourth padding are added to allow variable size chunking in subsequent writes without the need to rewrite the data storage 302.

With reference to FIG. 3C, there is shown the data storage 302 in the data storage system 200 (of FIG. 2) in which the first chunk 304A includes the padding 306A. Since, size of the first chunk 304A is big enough, the first chunk 304A did not spill to the second chunk 304B after variable size chunking. Hence, the first chunk 304A can be re-chunked granularly without affecting any other part of the data storage 302, that is without affecting the second chunk 304B, the third chunk 304C and the fourth chunk 304D and thus avoids rewrite of the whole data storage 302. In another example, if a virtual machine is backed-up, on consecutive backups, re-chunking of only one big chunk (e.g. the 4 MB big chunk) which had change, can be executed, and this allows us to keep the variable size chunking. The metadata for the offsets of the chunk ends can be kept in the first 8 KB (i.e. beginning block) of each such big chunks, such as the 4 MB chunks in this example. In other words, in order to allow accessing the data storage 302 in random access, metadata block is added at the beginning of each large chunk, where the metadata indicates a mapping from offset (of data blocks) in the logical chunk (e.g. the 4 MB chunk) stored in the next big chunk. The change indicator 206 (of FIG. 2) enables in keeping a track/count of how much for example the first chunk 304A has changed and further re-chunking the data storage 302 if the first chunk has changed more than a threshold value.

Figure 4:
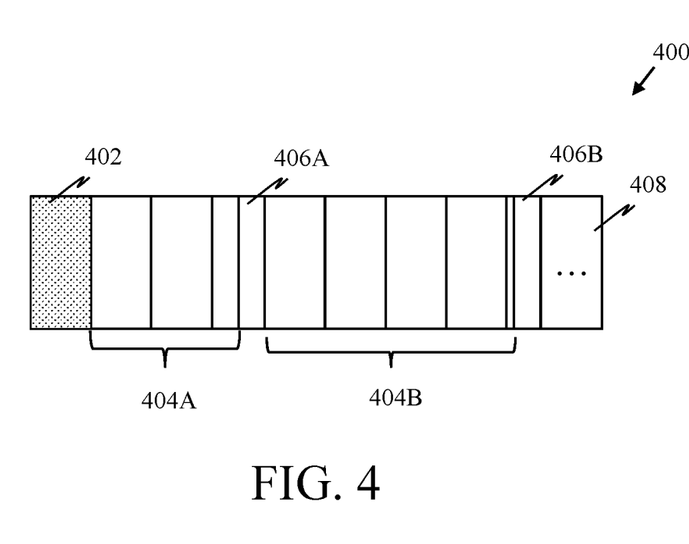
FIG. 4 is an illustration of an exemplary data structure of a chunk with a metadata block at a beginning of the chunk, in accordance with an embodiment of the present disclosure.

FIG. 4 is an illustration of an exemplary data structure of a chunk with a metadata block at a beginning of the chunk, in accordance with an embodiment of the present disclosure.

With reference to FIG. 4, there is shown a data structure 400 of a chunk (e.g. a 4 MB big chunk) of a data storage in the data storage system 200 (of FIG. 1). The data structure 400 of the chunk include a metadata block 402, blocks 404A and 404B containing data and patterned portions 406A and 406B indicate holes (e.g. remaining non-data portion of residue blocks without padding, or padding in some use cases). Further, a portion 408 at the end of the chunk indicates that the data structure 400 of the chunk is a 4 MB data containing chunk in a 6 MB sparse address space (with 2 MB padding).

In this example, a part of the original data storage (e.g. data storage 302) starts at offset which is multiple of 4 MB. For metadata, it is searched only at the beginning of the chunk (e.g. 4 MB chunk), and the data in the chunk which was originally 7 blocks and 54 KB, may be chunked to first chunk of 20 KB and second chunk of 34 KB (3rd chunk not shown here, but its size may be say 26 KB). Now, in this example, the metadata header in the metadata block 402 for 7 data blocks may be the following, in an example.

1. Block 0—points to block 0, start offset 0, next chunking point is at sparse block 2 at offset 4 KB;
2. Block 1—points to block 1, start offset 0, next chunking point is at sparse block 2 at offset 4 KB;
3. Block 2—points to block 2, start offset 0, next chunking point is at sparse block 2 at offset 4 KB;
4. Block 3—points to block 3, start offset 4 KB, next chunking point is at sparse block 7 at offset 2 KB;
5. Block 4—points to block 4, start offset 4 KB, next chunking point is at sparse block 7 at offset 2 KB;
6. Block 5—points to block 5, start offset 4 KB, next chunking point is at sparse block 7 at offset 2 KB;
7. Block 6—points to block 6, start offset 4 KB, next chunking point at sparse block 7 at offset 2 KB.

As the 4 MB of data contain 512 8 KB blocks, each pointer will point the location where the block starts, i.e. a block number in the 6 MB sparse block (2 bytes), what offset inside the block it starts (2 bytes), and the location of the next chunk in the chunking algorithm, this data allows understanding where all the 8 KB of data is located (which can be in 1-3 blocks/objects in the sparse representation) for accurate random access of data in the data file/chunks of data file. Thus, the metadata header (i.e. the metadata block 402 of 8 KB) may be divided into about 512, 16 bytes pointers (512*16=8192 bytes, i.e. ~8 KB). The change indicator 206 (of FIG. 2) which enables in keeping a track/count of how much for example the first chunk 304A has changed, may be stored in the metadata block 402.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment.

Conversely, various features of the present disclosure, which are, for brevity, described in the context of a single embodiment, may also be provided separately or in any suitable combination or as suitable in any other described embodiment of the disclosure.

What is claimed is:

1. A method of storing data to a data storage, wherein the data storage is divided into two or more variable size chunks, each of the variable size chunks is divided into blocks, and the data storage comprises a set of metadata for the data storage including information indicating a size of each variable size chunk,
wherein the data storage is also divided into two fixed size chunks, each fixed size chunk has a fixed size x and includes padding, the padding is positioned within the fixed size chunk and/or after the fixed size chunk to increase data amount in the chunk,
wherein division into fixed size chunks is independent of division into variable size chunks,
wherein the metadata includes a change indicator for each fixed size chunk indicating whether data has been written to the fixed size chunk,
wherein for one or more incoming write input output (IO) operations, the method comprises the following processes (a) and (b), each of which is written to a corresponding fixed size chunk:
(a) writing an incoming write IO to a position of the corresponding size chunk in the data storage, based on current parsing of the corresponding fixed size chunk;
(b) setting the change indicator for the corresponding fixed size chunk to indicate that the corresponding fixed size chunk has been changed since it was divided into variable sized chunks; and
based on one or more of the change indicators indicating that the division of an associated fixed size chunk or chunks into variable sized chunks should be changed, the method further comprises:
rechunking the fixed size chunk into variable sized chunks and setting the change indicator for that fixed size chunk to indicate that no write IO has been written to the fixed size chunk since it was divided into variable size chunks, and
setting the change indicator for that fixed size chunk to indicate that the fixed size chunk has not changed.

2. The method according to claim 1, wherein the change indicator comprises a change indicator bitmap comprising one or more bits, each bit is associated with an area of the corresponding fixed size chunk, and
wherein setting the change indicator to indicate that the corresponding fixed size chunk has been changed comprises:
setting one or more bits corresponding to one or more areas of the fixed size chunks that have been changed, to indicate that the one or more areas have been changed.

3. The method according to claim 1, wherein the change indicator comprises a counter for each fixed size chunk indicating the amount of data that has been written to the fixed size chunk, and
wherein setting the change indicator to indicate that the corresponding fixed size chunk has been changed comprises:
increasing the counter for the first fixed size chunk to indicate the amount of data written to the corresponding fixed size chunk.

4. The method according to claim 3, wherein each counter is considered to indicate that the division of the associated fixed size chunk or chunks into variable sized chunks should be changed if the counter indicates that more than a certain fraction of the fixed size chunk has been rewritten.

5. The method according to claim 4, wherein the fraction is 20%, 40% or 50% of the fixed size chunk.

6. The method according to claim 1, wherein the blocks may have different sizes depending on the amount of data in each block, and the metadata includes information indicating the size of each block.

7. The method according to claim 1, wherein the padding for each fixed size chunk is added to a total chunk size of $(1+n/y)*x$, wherein n is the size of the blocks, y is the average size of the variable size chunks and x is the size of the fixed size chunk.

8. The method according to claim 1, wherein each fixed size chunk comprises metadata indicating an offset of data in the fixed size chunk to allow random access to the data in the data storage.

9. The method according to claim 1, further comprising:
periodically performing offline deduplication on fixed size chunks for which the associated indicator bit indicates that one or more write IOs have been written to the fixed size chunk since it was divided into variable sized chunks.

10. A control unit for a data storage, wherein the data storage is divided into two or more variable size chunks, each of the variable size chunks is divided into blocks, and the data storage comprises a set of metadata for the data storage including information indicating the size of each variable size chunk,
wherein the data storage is also divided into two fixed size chunks, each fixed size chunk has a fixed size x and includes padding, the padding is positioned within the fixed size chunk and/or after the fixed size chunk to enable increasing the amount of data in the chunk,
wherein division into fixed size chunks is independent of division into variable size chunks, and the metadata includes a change indicator bit for each fixed size chunk indicating whether data has been written to the fixed size chunk,
wherein the control unit comprises a memory configured to store instructions; and a processor coupled to the memory and configured to execute the instructions to cause the control unit to:
upon receiving an incoming write input output (IO) for a fixed size chunk, write the incoming write IO in a position of the corresponding size chunk in the data storage, based on current parsing of the corresponding fixed size chunk;
set the change indicator bit for the corresponding fixed size chunk to indicate that a write IO has been written to the corresponding fixed size chunk since it was divided into variable sized chunks and to increase a counter for the first fixed size chunk to indicate the amount of data written to the corresponding fixed size chunk; and
based on one or more of the counters indicating that the division of an associated fixed size chunk or chunks into variable sized chunks should be changed, rechunk the fixed size chunk into variable sized chunks; set the change indicator for that fixed size chunk to indicate that no write IO has been written to the fixed size chunk since it was divided into variable size chunks; and set the counter for that fixed size chunk to zero.

11. The control unit according to claim 10, wherein the change indicator comprises a change indicator bitmap comprising one or more bits, each bit associated with an area of the corresponding fixed size chunk.

12. The control unit according to claim 10, wherein the change indicator comprises a counter for each fixed size chunk indicating the amount of data that has been written to the fixed size chunk.

13. The control unit according to claim 12, wherein the processor is configured to execute the instructions to cause the control unit to:
determine that a counter is considered to indicate that the division of the associated fixed size chunk or chunks into variable sized chunks should be changed, based on the counter indicating that more than a certain fraction of the fixed size chunk has been rewritten.

14. The control unit according to claim 10, wherein the processor is configured to execute the instructions to cause the control unit to:
periodically perform offline deduplication on fixed size chunks for which the associated indicator bit indicates that no write IO has been written to the fixed size chunk since it was divided into variable sized chunks.

15. A data storage system, wherein data storage is divided into two or more variable size chunks, each of the variable size chunks is divided into blocks, and the data storage comprises a set of metadata for the data storage including information indicating the size of each variable size chunk,
wherein the data storage is also divided into two fixed size chunks, each fixed size chunk has a fixed size x, and includes padding, the padding is positioned within the fixed size chunk and/or after the fixed size chunk to enable increasing the amount of data in the chunk,
wherein division into fixed size chunks is independent of division into variable size chunks, and the metadata includes a change indicator bit for each fixed size chunk indicating whether data has been written to the fixed size chunk,
wherein the data storage system comprises a control unit comprising a memory configured to store instructions; and a processor coupled to the memory and configured to execute the instructions to cause the control unit to:
upon receiving an incoming write input output (IO) for a fixed size chunk, write the incoming write IO in a position of the corresponding size chunk in the data storage, based on current parsing of the corresponding fixed size chunk;
set the change indicator bit for the corresponding fixed size chunk to indicate that a write IO has been written to the corresponding fixed size chunk since it was divided into variable sized chunks and to increase a counter for the first fixed size chunk to indicate the amount of data written to the corresponding fixed size chunk; and
based on one or more of the counters indicating that the division of an associated fixed size chunk or chunks into variable sized chunks should be changed, rechunk the fixed size chunk into variable sized chunks; set the change indicator for that fixed size chunk to indicate that no write IO has been written to the fixed size chunk because it was divided into variable size chunks; and set the counter for that fixed size chunk to zero.

16. The data storage of claim 15, wherein the change indicator comprises a change indicator bitmap comprising one or more bits, each bit associated with an area of the corresponding fixed size chunk.

17. The data storage of claim 15, wherein the change indicator comprises a counter for each fixed size chunk indicating the amount of data that has been written to the fixed size chunk.

18. The data storage system according to claim 15, wherein the blocks have different sizes depending on the amount of data in each block, and the metadata includes information indicating the size of each block.

19. The data storage system according to claim 15, wherein the padding for each fixed size chunk is added to a total chunk size of $(1+n/y)*x$, wherein n is the size of the blocks, y is the average size of the variable size chunks and x is the size of the fixed size chunk.

20. The data storage system according to claim 15, wherein each fixed size chunk comprises metadata indicating an offset of data in the fixed size chunk to allow random access to the data in the data storage.

* * * * *